United States Patent
Kuboki

(10) Patent No.: US 11,934,133 B2
(45) Date of Patent: Mar. 19, 2024

(54) IMAGE FORMING APPARATUS, IMAGE FORMING SYSTEM, AND IMAGE FORMING METHOD FOR CORRECTING AMOUNT OF DEVIATION IN COLOR OF IMAGE

(71) Applicant: Ryoichi Kuboki, Kanagawa (JP)

(72) Inventor: Ryoichi Kuboki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/804,640

(22) Filed: May 31, 2022

(65) Prior Publication Data

US 2022/0390887 A1    Dec. 8, 2022

(30) Foreign Application Priority Data

Jun. 8, 2021 (JP) ................. 2021-096003

(51) Int. Cl.
*G03G 15/16* (2006.01)
*G03G 15/00* (2006.01)
*G06K 15/00* (2006.01)
*G06K 15/02* (2006.01)

(52) U.S. Cl.
CPC ....... *G03G 15/5054* (2013.01); *G06K 15/027* (2013.01); *G06K 15/408* (2013.01)

(58) Field of Classification Search
USPC .......................................... 399/66
See application file for complete search history.

(56) References Cited

U.S. PATENT DOCUMENTS

| | | | |
|---|---|---|---|
| 8,593,685 B2 * | 11/2013 | Ono | H04N 1/60 358/1.9 |
| 2004/0202489 A1 * | 10/2004 | Kudou | G03G 15/0131 399/301 |
| 2011/0012981 A1 | 1/2011 | Kuboki | |
| 2012/0057892 A1 * | 3/2012 | Endoh | G03G 21/0011 399/257 |
| 2013/0149014 A1 * | 6/2013 | Tomishima | G03G 15/5054 399/301 |
| 2015/0277319 A1 * | 10/2015 | Tani | G03G 15/5041 399/74 |

FOREIGN PATENT DOCUMENTS

| | | | | |
|---|---|---|---|---|
| JP | 2009020173 A | * | 1/2009 | ........ G03G 15/161 |
| JP | 4813832 B2 | * | 11/2011 | |
| JP | 2012128365 A | * | 7/2012 | ........ B41J 29/38 |
| JP | 2016-021058 | | 2/2016 | |

* cited by examiner

*Primary Examiner* — Quana Grainger
(74) *Attorney, Agent, or Firm* — IPUSA, PLLC

(57) ABSTRACT

An image forming apparatus includes an image forming device and circuitry. The image forming device forms an image. The circuitry corrects an amount of deviation based on a pattern formed by the image forming device, changes a magnification of the pattern, and calculates the amount of deviation based on the magnification.

15 Claims, 13 Drawing Sheets

FIG. 8
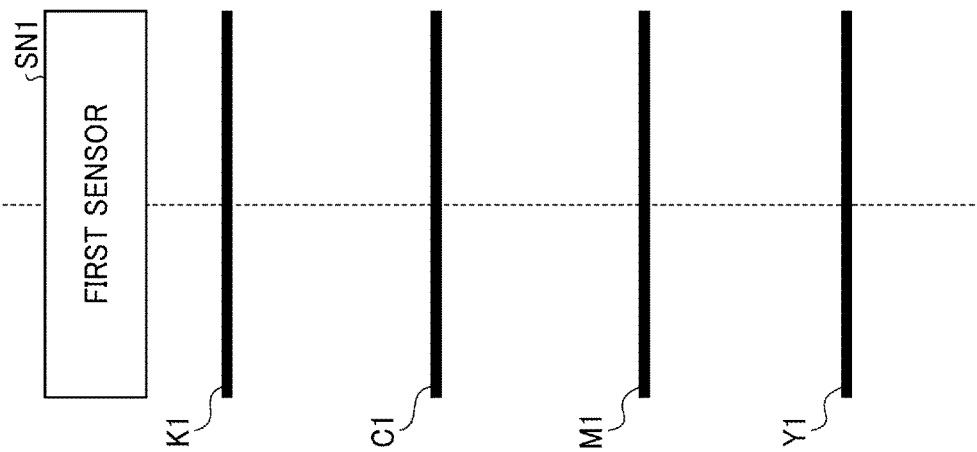
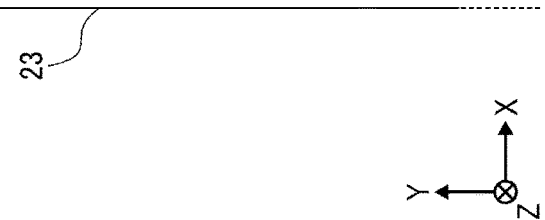
FIG. 9
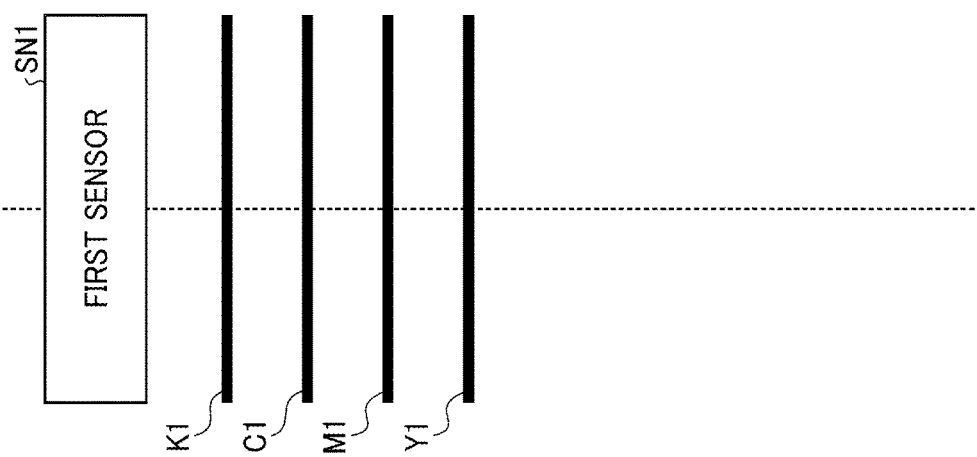
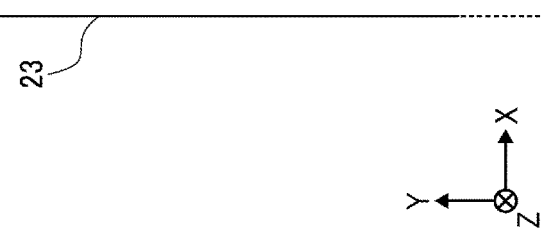

FIG. 11

| COLOR PLATE | A) IDEAL POSITION (NO CHANGE OF MAGNIFICATION) | B) POSITION AT WHICH PATTERN IS DETECTED | C) AMOUNT OF DEVIATION |
|---|---|---|---|
| K | 0 | 0 | - |
| C | 1000 | 1020 | 20 |
| M | 2000 | 2010 | 10 |
| Y | 3000 | 2950 | -50 |

FIG. 12

| COLOR PLATE | A) IDEAL POSITION (NO CHANGE OF MAGNIFICATION) | B) POSITION AT WHICH PATTERN IS DETECTED | C) AMOUNT OF DEVIATION | D) MAGNIFICATION CONSIDERED ① | E) MAGNIFICATION CONSIDERED ② |
|---|---|---|---|---|---|
| K | 0 | 0 | - | - | - |
| C | 1000 | 1040.4 | -31 | 19 | 20 |
| M | 2000 | 2050.2 | -90.5 | 9.5 | 10 |
| Y | 3000 | 3009 | -197.5 | -47.5 | -50 |

IMAGE FORMING APPARATUS, IMAGE FORMING SYSTEM, AND IMAGE FORMING METHOD FOR CORRECTING AMOUNT OF DEVIATION IN COLOR OF IMAGE

CROSS-REFERENCE TO RELATED APPLICATION

This patent application is based on and claims priority pursuant to 35 U.S.C. § 119(a) to Japanese Patent Application No. 2021-096003, filed on Jun. 8, 2021, in the Japan Patent Office, the entire disclosure of which is hereby incorporated by reference herein.

BACKGROUND

Technical Field

Embodiments of the present disclosure relate to an image forming apparatus, an image forming system, and an image forming method.

Related Art

Some techniques have been proposed that perform correction with a pattern to prevent, e.g., color misregistration in image formation.

The density of a toner pattern may vary depending on the linear velocity of a secondary transfer belt.

For this reason, an image forming apparatus finely adjusts the conveyance speed. Next, the image forming apparatus corrects a result of detection performed by a toner image detector, based on speed adjustment information. The image forming apparatus also corrects image forming conditions, based on the result of correction. As described above, some techniques have been proposed that detect a pattern on the secondary transfer belt with accuracy even when the image forming apparatus finely adjusts the linear velocity of the secondary transfer belt.

SUMMARY

According to an embodiment of the present disclosure, a novel image forming apparatus includes an image forming device and circuitry. The image forming device forms an image. The circuitry corrects an amount of deviation based on a pattern formed by the image forming device, changes a magnification of the pattern, and calculates the amount of deviation based on the magnification.

Also described is a novel image forming system. According to an embodiment of the present disclosure, the image forming system includes an image forming device and circuitry. The image forming device forms an image. The circuitry corrects an amount of deviation based on a pattern formed by the image forming device, changes a magnification of the pattern, and calculates the amount of deviation based on the magnification.

Also described is a novel image forming method. According to an embodiment of the present disclosure, the image forming method includes forming an image, correcting an amount of deviation based on a pattern formed by the forming, changing a magnification of the pattern, and calculating the amount of deviation based on the magnification.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a diagram illustrating a pattern in a case where magnification is unchanged;

FIG. 9 is a diagram illustrating the pattern of FIG. 8 in a case where the magnification is increased;

FIG. 11 is a table presenting an example of calculation of the amount of deviation in a case where the magnification is unchanged;

FIG. 12 is a table presenting an example of calculation of the amount of deviation in a case where the magnification is changed;

Figure 1:
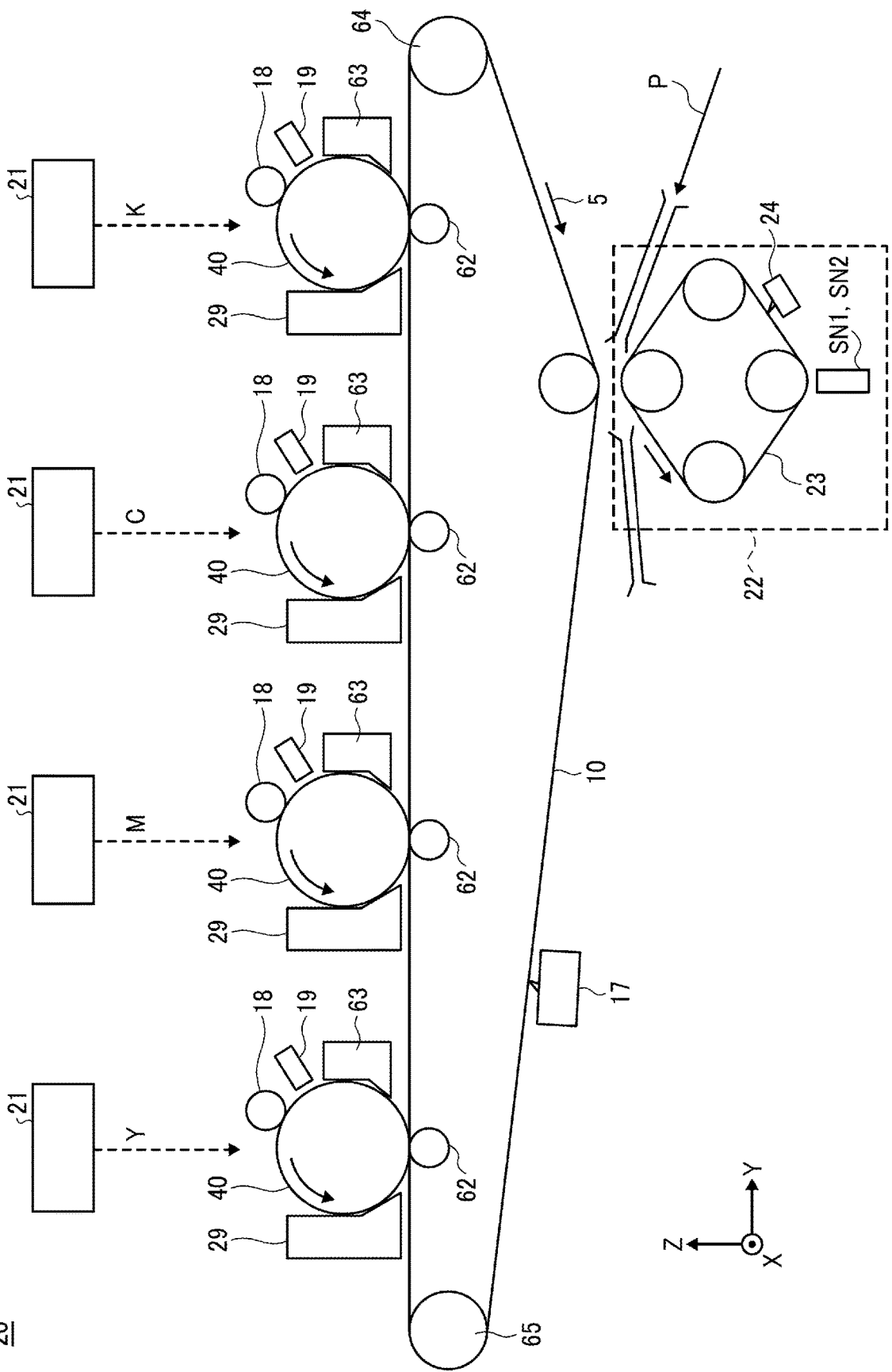
FIG. 1 is a diagram illustrating an image forming device included in an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

Note that, in the following description, suffixes Y, M, C, and K denote colors of yellow, magenta, cyan, and black, respectively. To simplify the description, these suffixes are omitted unless necessary.

As used herein, the term "connected/coupled" includes both direct connections and connections in which there are one or more intermediate connecting elements.

Now, a description is given of a first embodiment of the present disclosure.

For example, an image forming apparatus 100 is an apparatus as described below.

Now, a description is given of the image forming apparatus 100 as an example.

FIG. 1 is a diagram illustrating an image forming device 20 included in the image forming apparatus 100 according to the present embodiment.

The image forming apparatus 100 includes, e.g., the image forming device 20 as described below to form images.

The image forming apparatus 100 includes, e.g., four sets of light beam scanners 21 to form images of four colors, namely, yellow, magenta, cyan, and black. The four color images are superimposed one atop another to form a composite color image. In the following description, yellow, magenta, cyan, and black may be referred to as Y, M, C, and K, respectively.

Figure 2:
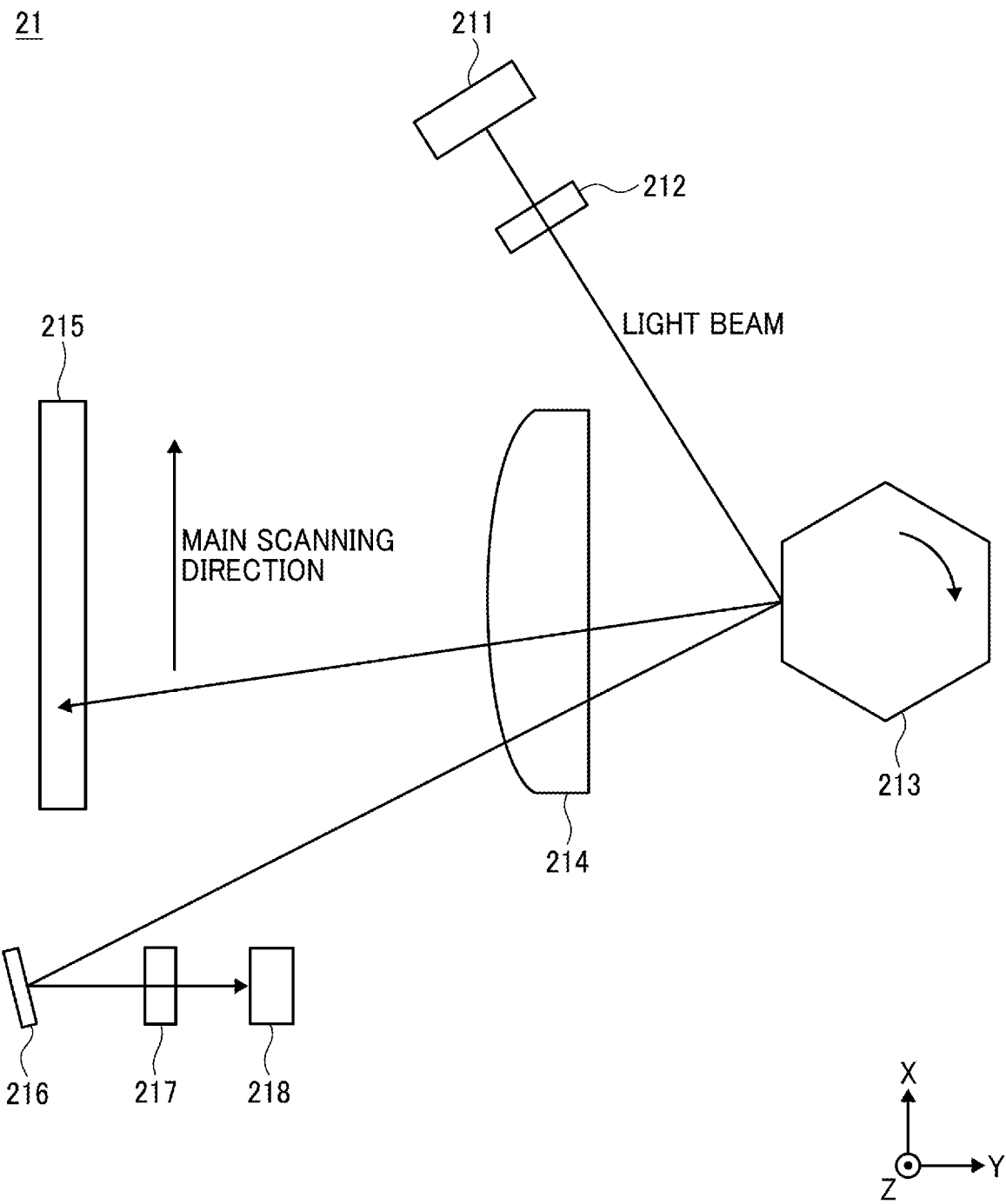
FIG. 2 is a diagram illustrating a light beam scanner.

The light beam scanner 21 is driven and modulated according to image data and selectively emits a light beam. As illustrated in FIG. 2, the emitted light beam is deflected by a polygon mirror 213 that is rotated by a polygon motor as a drive source. Thereafter, the light beam passes through an fθ lens 214 and is reflected by a deflection mirror 215 to be directed over a drum-shaped photoconductor 40 serving as an image bearer. A detailed description thereof is deferred.

Referring back to FIG. 1, the image forming device 20 includes the photoconductor 40 and some pieces of image forming equipment around the photoconductor 40 such as a charger 18, a developing device 29, a primary transfer device 62, a drum cleaner 63, and a neutralizer 19. The image forming device 20 further includes an intermediate transfer belt 10 facing the photoconductor 40 and a secondary transfer belt 23 facing the intermediate transfer belt 10.

The image forming apparatus 100 performs an electrophotographic image forming process. Specifically, first, the image forming apparatus 100 forms a toner image of a first color (Y in this example) on the intermediate transfer belt 10 by charging, exposure, development, and transfer. The intermediate transfer belt 10 is rotated in a direction 5 by, e.g., a first support roller 64 and a second support roller 65.

Next, the image forming apparatus 100 forms toner images in the order of a second color (M in this example), a third color (C in this example), and a fourth color (K in this example). Thus, the image forming apparatus 100 superimposes the toner images in four colors one atop another to form a composite color toner image on the intermediate transfer belt 10.

Thereafter, the image forming apparatus 100 transfers, with a secondary transfer device 22, the composite color toner image from the intermediate transfer belt 10 onto a recording medium P conveyed. Thus, the image forming apparatus 100 forms the composite color toner image, which includes the superimposed toner images in four colors, on the recording medium P.

Thereafter, the image forming apparatus 100 fixes, with a fixing device, the composite color toner image onto the recording medium P.

The image forming device 20 includes an intermediate-transferor cleaner 17 that removes the toner image remaining on the intermediate transfer belt 10.

The secondary transfer device 22 includes, e.g., a first sensor SN1 and a second sensor SN2. The first sensor SN1 and the second sensor SN2 detect a pattern formed on the secondary transfer belt 23. Specifically, the primary transfer device 62 transfers the pattern borne on the photoconductor 40 from the photoconductor 40 onto the intermediate transfer belt 10. The secondary transfer device 22 transfers the pattern from the intermediate transfer belt 10 onto the secondary transfer belt 23. The first sensor SN1 and the second sensor SN2 detect the pattern thus formed on the secondary transfer belt 23.

The first sensor SN1 and the second sensor SN2 are, e.g., reflective optical sensors.

Based on results of detection performed by the first sensor SN1 and the second sensor SN2, an amount of deviation in a conveyance direction and an amount of deviation in a direction perpendicular to the conveyance direction are calculated. Note that the conveyance direction is a direction in which the recording medium P is conveyed.

The secondary transfer device 22 may include a secondary-transfer-belt cleaner 24, for example.

The image forming apparatus 100 may further include a toner bottle, for example.

FIG. 2 is a diagram illustrating the light beam scanner 21 as an example.

In other words, FIG. 2 is a top view of one of the light beam scanners 21 for Y, M, C, and K having substantially the same configuration in the present example.

The light beam scanner 21 includes a laser diode (LD) control board 211 that emits a light beam. The light beam emitted from the LD control board 211 passes through a cylinder lens 212 and strikes the polygon mirror 213.

The polygon mirror 213 rotates. The light beam is deflected by the rotation of the polygon mirror 213.

The light beam reflected by the polygon mirror 213 passes through the fθ lens 214 and is reflected by the deflection mirror 215 to be directed over the photoconductor 40.

At an end on scanning, a synchronization mirror 216, a synchronization lens 217, and a synchronization sensor 218 are disposed, for example.

The light beam passing through the fθ lens 214 is reflected by the synchronization mirror 216. The light beam reflected by the synchronization mirror 216 is condensed by the synchronization lens 217. The condensed light beam strikes the synchronization sensor 218.

When the synchronization sensor 218 detects the light beam, the writing timing is determined. Thus, the synchronization sensor 218 is used to generate a synchronization detection signal, for example.

Figure 3:
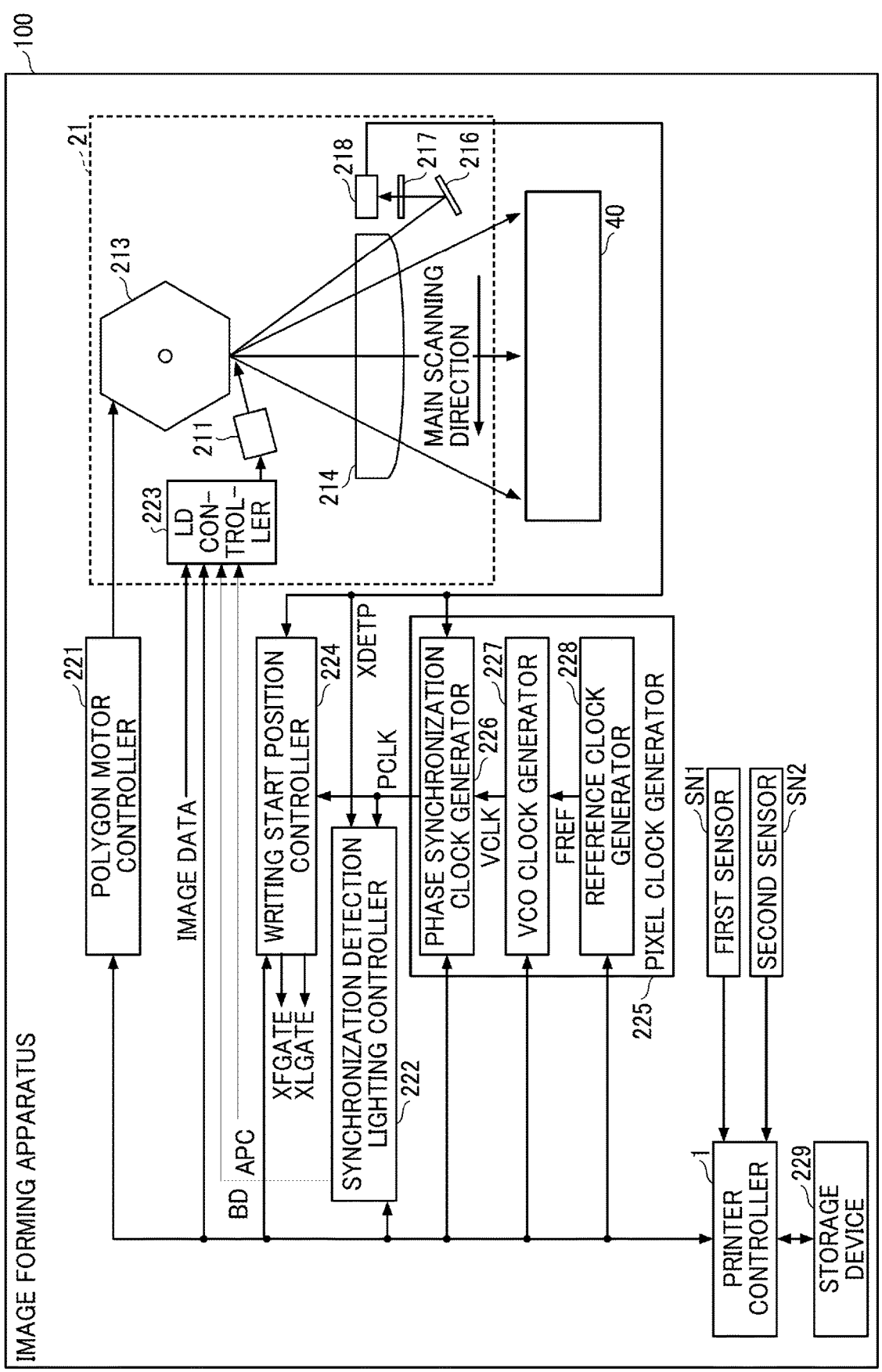
FIG. 3 is a diagram illustrating a configuration for controlling the light beam scanner of FIG. 2.

FIG. 3 is a diagram illustrating a configuration for controlling, e.g., the light beam scanner 21.

FIG. 3 illustrates the configuration for one color. For example, a printer controller 1, the first sensor SN1, and the second sensor SN2 are disposed for each color.

When the light beam strikes the synchronization sensor 218, the synchronization sensor 218 outputs a synchronization detection signal XDETP. The synchronization detection signal XDETP is output to a synchronization detection lighting controller 222, a writing start position controller 224, and a pixel clock generator 225.

The pixel clock generator 225 includes a phase synchronization clock generator 226, a VCO clock generator 227, and a reference clock generator 228. The pixel clock generator 225 generates a pixel clock signal PCLK, which is synchronized with the synchronization detection signal XDETP. Thereafter, the pixel clock generator 225 transmits the pixel clock signal PCLK to the synchronization detection lighting controller 222 and the writing start position controller 224.

The synchronization detection lighting controller 222 turns on an LD forcibly lighting signal BD to detect the synchronization detection signal XDETP. When the LD forcibly lighting signal BD is turned ON, the LD control board 211 emits a light beam, in other words, the LD control board 211 turns on an LD.

After detecting the synchronization detection signal XDETP, the synchronization detection lighting controller 222 uses the synchronization detection signal XDETP and the pixel clock signal PCLK to generate the LD forcibly lighting signal BD. Specifically, the synchronization detection lighting controller 222 generates the LD forcibly lighting signal BD so as to light the LD to such an extent that flare light is not generated at the time when the synchronization detection signal XDETP is detectable and to turn off the LD when the synchronization detection signal XDETP is detected.

The synchronization detection lighting controller 222 transmits the generated LD forcibly lighting signal BD to an LD controller 223.

The synchronization detection lighting controller 222 generates a light-amount control timing signal APC. Specifically, the synchronization detection lighting controller 222 uses the synchronization detection signal XDETP and the pixel clock signal PCLK to generate the light-amount control timing signal APC. The synchronization detection lighting controller 222 transmits the generated light-amount control timing signal APC to the LD controller 223.

The light-amount control timing signal APC is used outside a writing area, for example. The light-amount control timing signal APC is used to control the amount of light.

The LD controller 223 lights the LD according to image data. A signal indicating the image data is a signal synchronized with the LD forcibly lighting signal BD, the light-amount control timing signal APC, and the pixel clock signal PCLK. When the LD is lighted, the light beam is polarized by the polygon mirror 213. Thereafter, the light beam reflected by the polygon mirror 213 passes through the fθ lens 214 to be directed over the photoconductor 40.

A polygon motor controller 221 controls the polygon mirror 213 according to a control signal transmitted from the printer controller 1. For example, the polygon motor controller 221 causes the polygon mirror 213 to rotate at a given rotation speed (or a given number of rotations).

The writing start position controller 224 generates a main-scanning control signal XLGATE and a sub-scanning control signal XFGATE.

The main-scanning control signal XLGATE and the sub-scanning control signal XFGATE determine when to start writing an image and an image width. Based on the synchronization detection signal XDETP, the pixel clock signal PCLK, and a control signal transmitted by the printer controller 1, the writing start position controller 224 generates the main-scanning control signal XLGATE and the sub-scanning control signal XFGATE.

The first sensor SN1 and the second sensor SN2 detect a pattern that is used to calculate a positional deviation of an image. Specifically, when the first sensor SN1 and the second sensor SN2 detect the pattern, the first sensor SN1 and the second sensor SN2 transmits obtained information to the printer controller 1. Based on the information, the printer controller 1 calculates the amount of deviation. Based on the calculated amount of deviation, the printer controller 1 generates correction data. The correction data is used to set the writing start position controller 224 and the pixel clock generator 225, for example. The correction data is stored in a storage device 229.

The storage device 229 provides, e.g., the correction data to the printer controller 1 for image formation.

Figure 4:
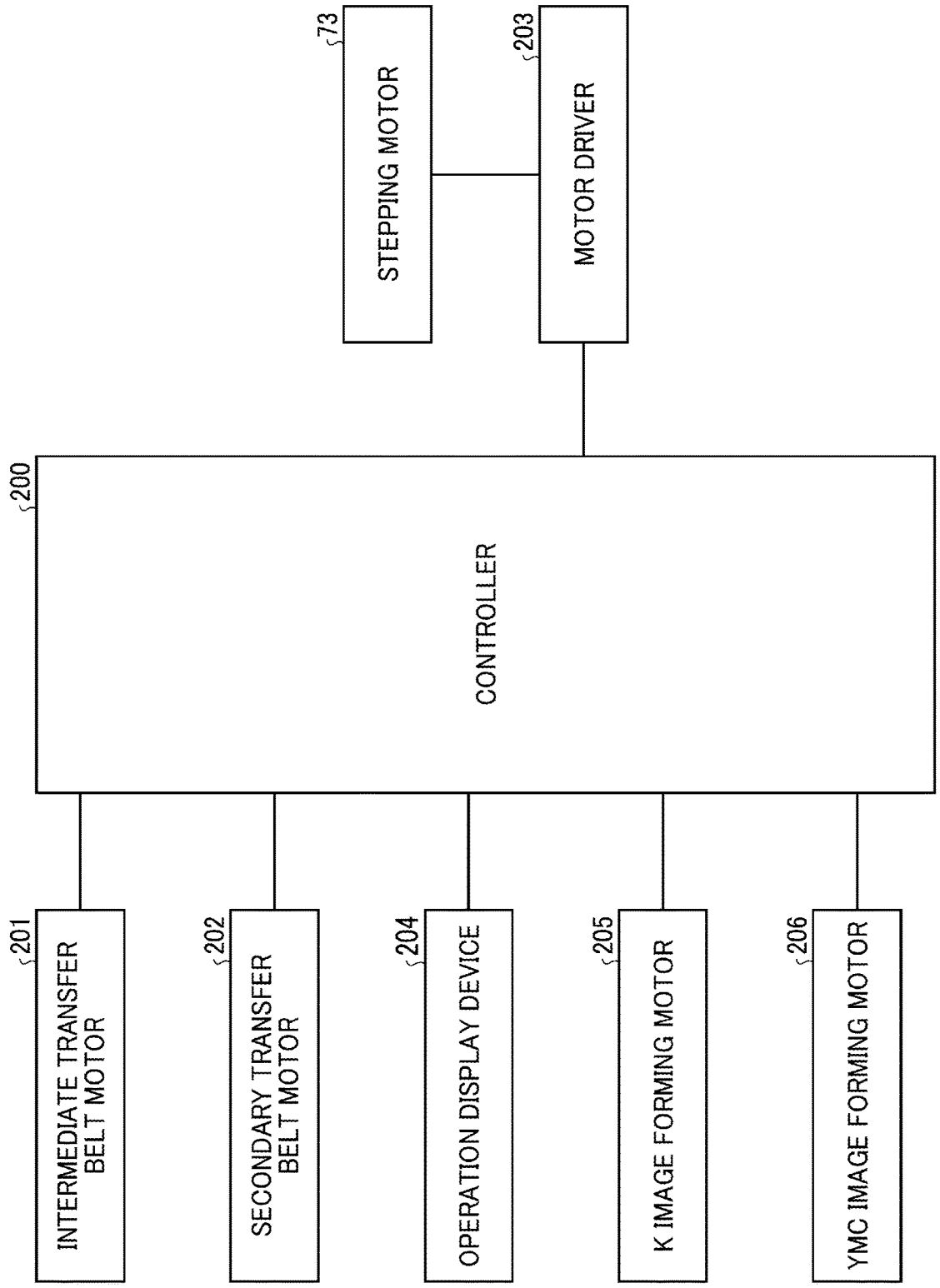
FIG. 4 is a diagram illustrating a configuration of an electric circuit.

FIG. 4 is a diagram illustrating a configuration of an electric circuit.

For example, the image forming apparatus 100 has a configuration in which the components described below are connected as illustrated in FIG. 4.

A controller 200 performs processing such as control of devices, acquisition of data from sensors, and calculation. For example, the controller 200 is a device including a central processing unit (CPU), a random access memory (RAM), and a read only memory (ROM).

The controller 200 is connected to an intermediate transfer belt motor 201, a secondary transfer belt motor 202, a motor driver 203, an operation display device 204, a K image forming motor 205 for black, and a YMC image forming motor 206 for yellow, magenta, and cyan.

For example, the controller 200 controls the rotation speed of the secondary transfer belt motor 202. The secondary transfer belt motor 202 thus controlled changes the rotation speed of the secondary transfer belt 23, in other words, the conveyance speed at which the secondary transfer belt 23 conveys the recording medium P. Accordingly, the image magnification is changed.

The intermediate transfer belt motor 201 rotates a roller that drives the intermediate transfer belt 10. In other words, when the intermediate transfer belt motor 201 is driven, the intermediate transfer belt 10 moves.

The secondary transfer belt motor 202 rotates a roller that drives the secondary transfer belt 23. In other words, when the secondary transfer belt motor 202 is driven, the secondary transfer belt 23 moves.

The controller 200 controls a stepping motor 73 via the motor driver 203. For example, the controller 200 causes the stepping motor 73 to rotate backward by a given amount when the secondary transfer belt 23 is in contact with the intermediate transfer belt 10 in the secondary transfer. When the stepping motor 73 rotates backward under such control, a movable roller moves down and separates the secondary transfer belt 23 from the intermediate transfer belt 10.

On the other hand, the controller 200 causes the stepping motor 73 to rotate forward when the secondary transfer belt 23 is apart from the intermediate transfer belt 10 in the secondary transfer. When the stepping motor 73 rotates forward under such control, the movable roller moves up and brings the secondary transfer belt 23 into contact with the intermediate transfer belt 10.

The operation display device 204 is disposed outside the image forming apparatus 100. The operation display device 204 includes, e.g., a touch panel or keys. The operation display device 204 receives operations from a user. In other words, the user operates the operation display device 204 to input information and performs settings.

The operation display device 204 transmits the input information to the controller 200. The operation display device 204 also displays, e.g., processing results to the user.

The K image forming motor 205 is a driving source of an image forming unit for black. Similarly, the YMC image forming motor 206 is a driving source for image forming units for yellow, magenta, and cyan.

For example, when the secondary transfer belt 23 or the intermediate transfer belt 10 is replaced, a work record is input. When such a work record is input, the image forming apparatus 100 supplies a lubricant according to the type of the replaced belt.

Note that the configuration of the image forming apparatus 100 is not limited to the configuration illustrated in FIG. 4. For example, the image forming apparatus 100 may include another component in the configuration illustrated in FIG. 4.

Figure 5:
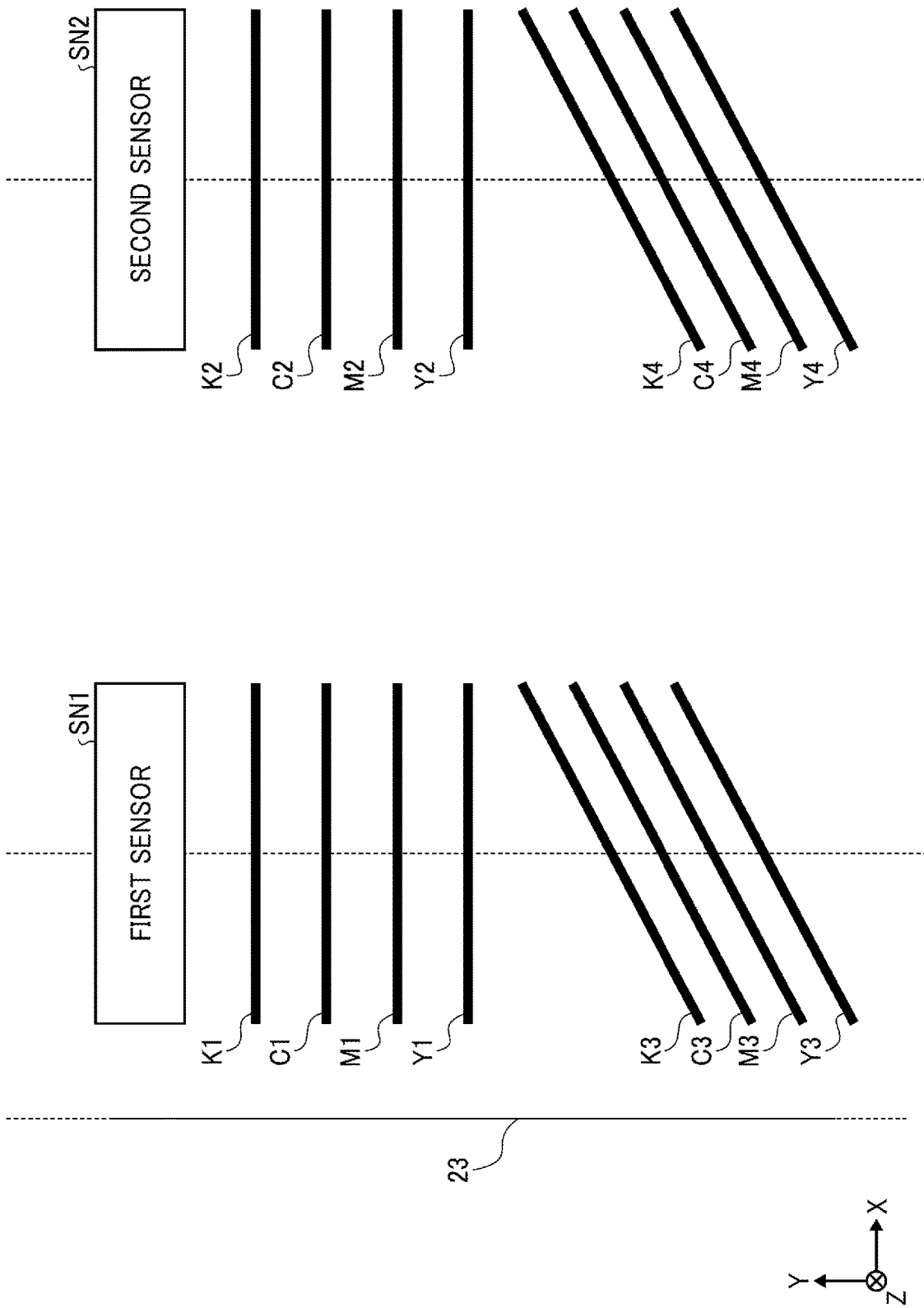
FIG. 5 is a diagram illustrating a pattern and an example of detection of the pattern.

Referring now to FIG. 5, a description is given of a pattern and an example of detection of the pattern.

FIG. 5 is a diagram illustrating a pattern and an example of detection of the pattern.

For example, the pattern has a shape as illustrated in FIG. 5 and is formed on the secondary transfer belt 23 during a period in which image formation is not performed.

Now, a description is given of an example in which the pattern has a shape as illustrated in FIG. 5 and two sensors are disposed as illustrated in FIG. 5.

Specifically, the first sensor SN1 and the second sensor SN2 are aligned in a direction intersecting a conveyance direction of the secondary transfer belt 23. Note that the conveyance direction of the secondary transfer belt 23 is a direction in which the secondary transfer belt 23 conveys the recording medium P. The pattern, the number of sensors and the arrangement of the sensors are not limited to those illustrated in FIG. 5 and may be other than those illustrated in FIG. 5.

In the present example, specifically, the pattern includes horizontal lines such as a first black horizontal line K1, a first cyan horizontal line C1, a first magenta horizontal line M1, a first yellow horizontal line Y1, a second black horizontal line K2, a second cyan horizontal line C2, a second magenta horizontal line M2, and a second yellow horizontal line Y2.

The pattern further includes oblique lines such as a third black oblique line K3, a third cyan oblique line C3, a third magenta oblique line M3, a third yellow oblique line Y3, a fourth black oblique line K4, a fourth cyan oblique line C4, a fourth magenta oblique line M4, and a fourth yellow oblique line Y4. As described above, the pattern is a combination of horizontal lines and oblique lines formed on the secondary transfer belt 23, for example. The horizontal lines intersect the conveyance direction of the secondary transfer belt 23; whereas the oblique lines are inclined with respect to the horizontal lines. The image forming device 20 forms the horizontal lines and the oblique lines alternately along the conveyance direction of the secondary transfer belt 23 as illustrated in FIG. 5, for example. Note that the pattern illustrated in FIG. 5 may be referred to as a pattern set in the following description.

When the secondary transfer belt 23 moves (upward in FIG. 5), the first sensor SN1 and the second sensor SN2 detect a horizontal line or an oblique line. The results of detection performed by the first sensor SN1 and the second sensor SN2 are transmitted to the printer controller 1.

For example, the amount of deviation is calculated in units of time with reference to a given color.

Now, a description is given of an example in which black is used as a reference color.

Specifically, the time when the oblique line is detected changes when the image position or the image magnification deviates in a main scanning direction. On the other hand, the time when the horizontal line is detected changes when the image position deviates in a sub-scanning direction.

In the example of the first sensor SN1, a period of time from when the first black horizontal line K1 is detected to when the third black oblique line K3 is detected is used as a reference time in the main scanning direction. For example, in the case of cyan, a period of time from when the first cyan horizontal line C1 is detected to when the third cyan oblique line C3 is detected is measured.

Then, the time for cyan is compared with the reference time, which is the time for black, to calculate the amount of deviation for cyan.

Similarly, in the example of the second sensor SN2, a period of time from when the second black horizontal line K2 is detected to when the fourth black oblique line K4 is detected is used as a reference time in the main scanning direction. For example, in the case of cyan, a period of time from when the second cyan horizontal line C2 is detected to when the fourth cyan oblique line C4 is detected is measured.

Then, similarly to the example of the first sensor SN1, the time for cyan is compared with the reference time, which is the time for black, to calculate the amount of deviation for cyan.

In this case, the magnification error for cyan is calculated as the amount of deviation, from the difference between the amount of deviation based on the second cyan horizontal line C2 and the fourth cyan oblique line C4 and the amount of deviation based on the first cyan horizontal line C1 and the third cyan oblique line C3.

The image forming apparatus 100 converts the amount of deviation thus calculated into a pixel clock to correct the amount of deviation. For example, the image forming apparatus 100 adjusts the main-scanning control signal XLGATE, in other words, the image forming apparatus 100 adjusts the time to start writing, to correct the amount of deviation in the main scanning direction.

Now, a description is given of correction of the amount of deviation in the sub-scanning direction.

In the present example, "Tc" represents a time in an ideal state. "TKC1" represents a period of time from the first black horizontal line K1 to the first cyan horizontal line C1. "TKC2" represents a period of time from the second black horizontal line K2 to the second cyan horizontal line C2.

The amount of deviation in the sub-scanning direction is calculated by Equation (1) below, for example.

$$\text{Amount of deviation in the sub-scanning direction} = \{(TKC2 + TKC1)/2\} - Tc \quad (1)$$

The amount of deviation calculated by Equation (1) above is the amount of deviation for cyan with respect to black. For example, the image forming apparatus 100 adjusts the sub-scanning control signal XFGATE to correct the amount of deviation in the sub-scanning direction. The image forming apparatus 100 corrects the amount of deviation for the other colors in substantially the same manner.

Note that the shape of the pattern is not limited to the shape formed at two locations as illustrated in FIG. 5. Although a single pattern set as illustrated in FIG. 5 is arranged in the present embodiment, a plurality of pattern sets may be arranged in another embodiment. The amount of deviation may be calculated by statistical processing such as averaging of the results of detection or calculation of a plurality of patterns.

Now, a description is given of overall processing.

Figure 6:
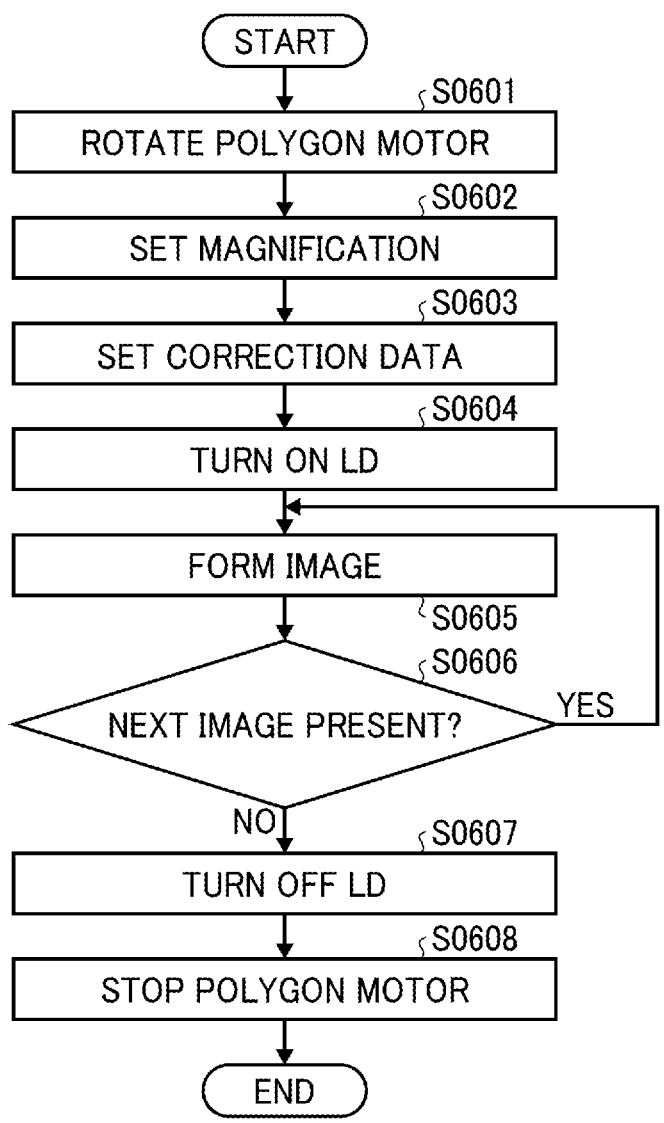
FIG. 6 is a flowchart of a control process in image formation.

The magnification of the pattern is set in a process illustrated in FIG. 6, for example. In the present example, the image forming apparatus 100 performs the process illustrated in FIG. 6 and then performs correction in a process illustrated in FIG. 7.

FIG. 6 is a flowchart of a control process in image formation.

For example, when a user presses a start key on a control panel, the image forming apparatus 100 starts the process illustrated in FIG. 6.

In step S0601, the image forming apparatus 100 starts rotation of the polygon motor.

The number of rotations of the polygon motor is specified by the printer controller 1, for example.

In step S0602, the image forming apparatus 100 sets the image magnification.

In step S0603, the image forming apparatus 100 sets correction data.

In steps S0602 and step S0603, the image forming apparatus 100 determines, e.g., writing start positions in the main scanning direction and the sub-scanning direction. The image forming apparatus 100 also turns on the LD to output the synchronization detection signal XDETP and performs an APC operation to light the LD with a given amount of light.

Note that the image forming apparatus 100 may set other image forming settings.

In step S0604, the image forming apparatus 100 starts lighting the LD.

In step S0605, the image forming apparatus 100 forms an image.

In step S0606, the image forming apparatus 100 determines whether the next image is present.

When the next image is present (YES in step S0606), the image forming apparatus 100 proceeds to step S0605. By contrast, when the next image is not present (NO in step S0606), the image forming apparatus 100 proceeds to step S0607.

In short, when a target image is present, the image forming apparatus 100 forms the image according to the settings. When a target image is present, the image forming apparatus 100 repeatedly performs image formation. By contrast, when a target image is not present, the image forming apparatus terminates the image formation as below.

In step S0607, the image forming apparatus 100 turns off the LD.

In step S0608, the image forming apparatus 100 stops the rotation of the polygon motor.

Figure 7:
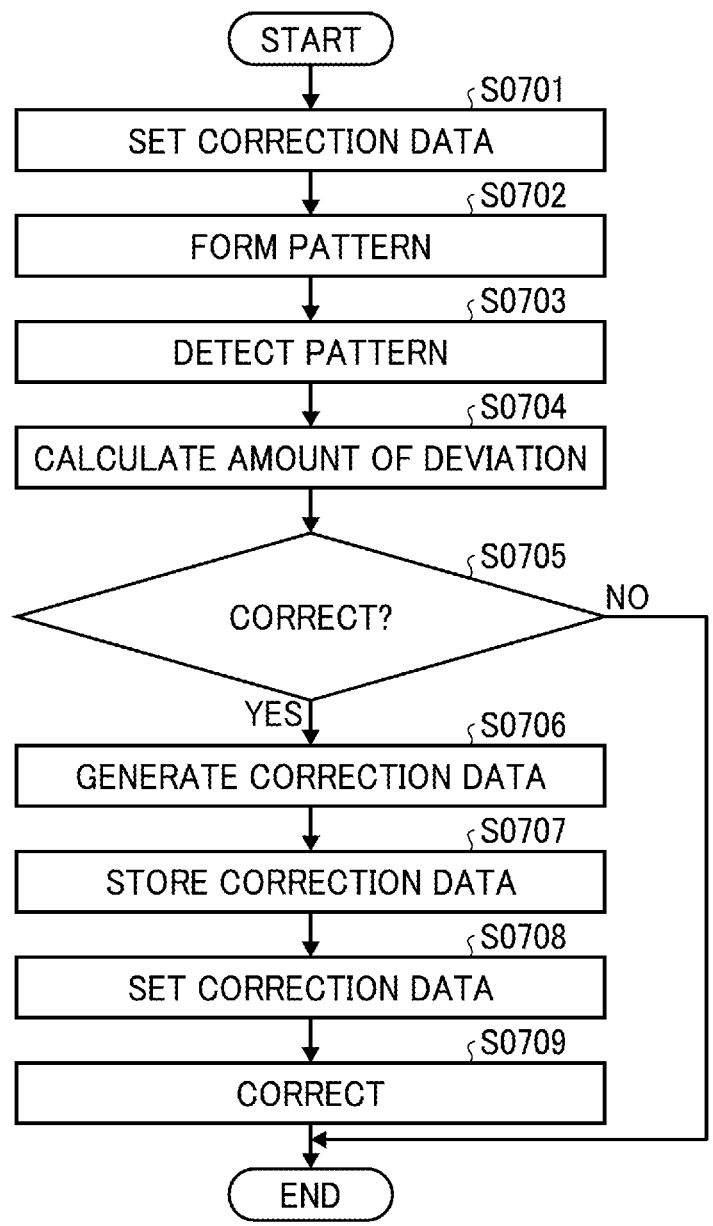
FIG. 7 is a flowchart of a control process for correction.

FIG. 7 is a flowchart of a control process for correction.

For example, when the image forming apparatus 100 performs image formation on a preset number of sheets or when the image forming apparatus 100 measures the temperature and determines that the temperature changes by a certain value or greater, the image forming apparatus 100 performs correction as follows.

In step S0701, the image forming apparatus 100 sets correction data.

In step S0702, the image forming apparatus 100 forms a pattern.

In step S0703, the image forming apparatus 100 detects the pattern.

In step S0704, the image forming apparatus 100 calculates the amount of deviation.

For example, the image forming apparatus 100 forms and detects the pattern as illustrated in FIG. 5. Then, the image forming apparatus 100 calculates the amount of deviation based on the result of detection.

In step S0705, the image forming apparatus 100 may determine whether to perform correction. When determining to perform correction (YES in step S0705), the image forming apparatus 100 proceeds to step S0706. By contrast, when determining not to perform correction (NO in step S0705), the image forming apparatus 100 ends the process without performing correction. When the image forming apparatus 100 does not perform correction, the correction data is maintained.

Specifically, for example, the image forming apparatus 100 determines to perform correction when the amount of deviation is equal to or greater than half a correction resolution. In other words, the image forming apparatus 100 may perform correction when the amount of deviation is a large value equal to or greater than a certain value. A reference value that is used to determine whether to perform correction is set in advance, for example.

In step S0706, the image forming apparatus 100 generates correction data.

In step S0707, the image forming apparatus 100 stores the correction data.

In step S0708, the image forming apparatus 100 sets the correction data.

As described above, the image forming apparatus 100 calculates the amount of deviation based on the pattern. Based on the amount of deviation thus calculated, the image forming apparatus 100 generates new correction data. Then, the image forming apparatus 100 updates the correction data set in step S0701 with the new correction data generated. Thereafter, the image forming apparatus 100 performs correction based on the updated correction data.

In step S0709, the image forming apparatus 100 performs correction to reduce the amount of deviation.

Thereafter, the image forming apparatus 100 performs image formation in a corrected state.

The correction data is, e.g., data indicating a set value of a pixel clock frequency that determines a magnification in the main scanning direction, a set value of the main-scanning control signal XLGATE, and a set value of the sub-scanning control signal XFGATE.

The order of steps or processes is not limited to the order described above. For example, the operations in the steps described above may be performed in parallel or in an order different from the order illustrated.

Figure 10:
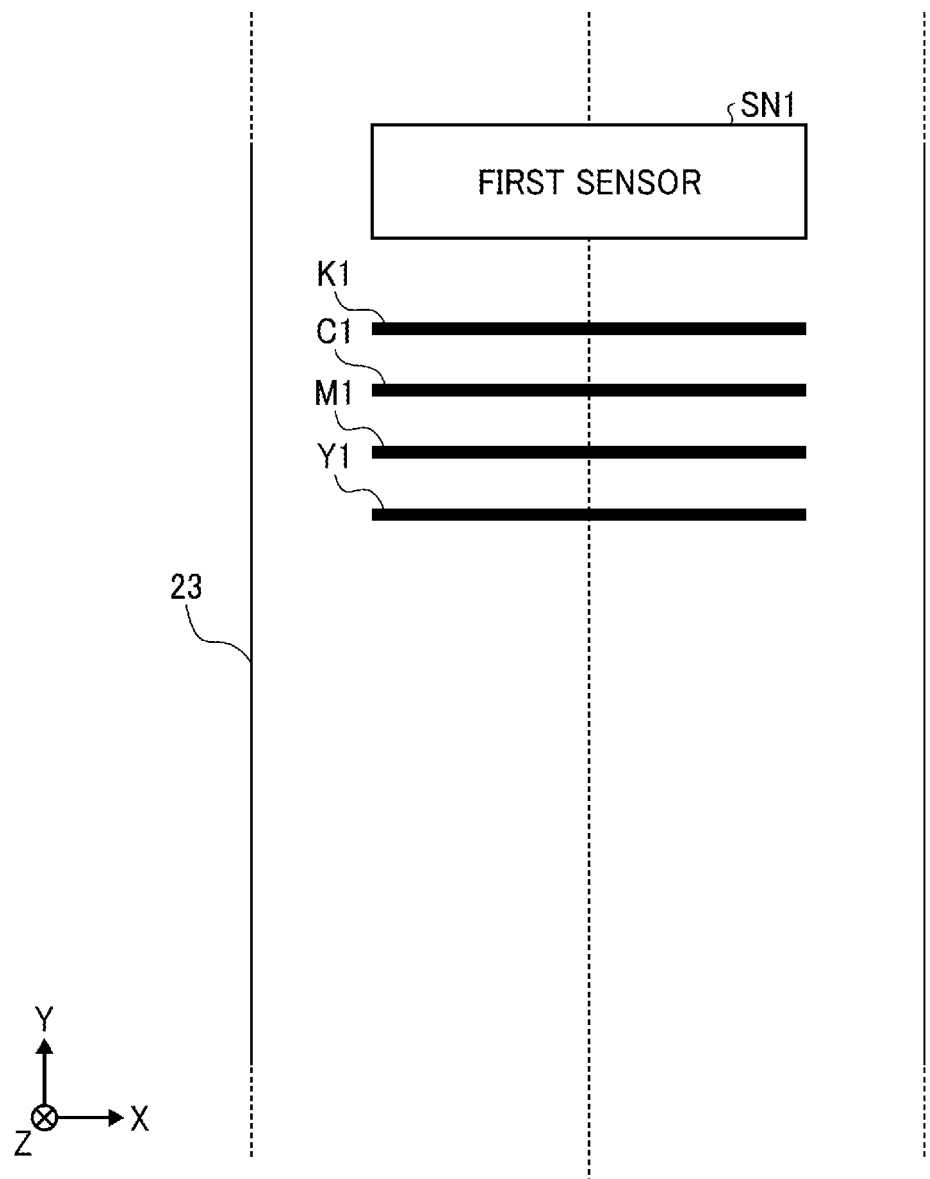
FIG. 10 is a diagram illustrating the pattern of FIG. 8 in a case where the magnification is decreased.

Referring now to FIGS. 8 to 10, a description is given of changes of magnification.

In the examples illustrated in FIGS. 8 to 10, the first sensor SN1 detect a pattern including the first black horizontal line K1, the first cyan horizontal line C1, the first magenta horizontal line M1, and the first yellow horizontal line Y1.

FIG. 8 is a diagram illustrating the pattern in a case where the magnification is unchanged.

Specifically, FIG. 8 illustrates a reference interval between horizontal lines along the Y axis. In other words, FIG. 8 illustrates the interval between horizontal lines along the Y axis in a case where the magnification is unchanged.

FIG. 9 is a diagram illustrating the pattern in a case where the magnification is increased.

The pattern illustrated in FIG. 9 is different from the pattern illustrated in FIG. 8 in that the pattern illustrated in FIG. 9 has an increased interval between the horizontal lines.

FIG. 10 is a diagram illustrating the pattern in a case where the magnification is decreased.

The pattern illustrated in FIG. 10 is different from the pattern illustrated in FIG. 8 in that the pattern illustrated in FIG. 10 has a decreased interval between the horizontal lines.

For example, the magnification may be changed due to variations in mechanical components. The magnification may be also changed depending on whether a sheet is present or the type such as thickness of a recording medium. The magnification may be selectively set.

The magnification is set along, e.g., changing the number of rotations of a polygon motor, the image data, or the conveyance speed of a secondary transfer belt.

The conveyance speed of the secondary transfer belt may be changed in consideration of the thickness. By changing the conveyance speed in consideration of the thickness, the image magnification on the recording medium is adjusted. However, in this case, the pattern on the secondary transfer belt on which no recording medium is conveyed may be influenced by the magnification. In order to correct the amount of deviation with accuracy even in a case where the magnification is finally changed due to, e.g., the thickness of the recording medium, the image forming apparatus 100 performs correction in consideration of the magnification.

In the following description, "Tc" represents an interval between the first black horizontal line K1 and the first cyan horizontal line C1 illustrated in FIG. 8 in a case where the magnification is unchanged. Note that the unit of "Tc" is time. Similarly, "Tm" represents an interval between the first black horizontal line K1 and the first magenta horizontal line M1 illustrated in FIG. 8.

Similarly, "Ty" represents an interval between the first black horizontal line K1 and the first yellow horizontal line Y1 illustrated in FIG. 8. In other words, "Tc," "Tm," and "Ty" are ideal times with no amount of deviation.

On the other hand, "TKC1" represents the period of time from when the first sensor SN1 detects the first black horizontal line K1 to when the first sensor SN1 detects the first cyan horizontal line C1.

In this case, the amount of deviation is calculated as "TKC1–Tc," for example. In order to correct such an amount of deviation in the sub-scanning direction, the image forming apparatus 100 changes the timing of the sub-scanning control signal XFGATE. The image forming apparatus 100 corrects color misregistration with the correction data indicating the correction described above.

The magnification is ascertained from previous settings, for example. In the following description, the variable amount due to enlargement or reduction may be referred to as "x"%. When such a magnification is set, the image forming apparatus 100 calculates the amount of deviation as "TKC1–Tc×(100+x)/100" in the case of black, for example.

When performing correction in consideration of the magnification as described above, the image forming apparatus 100 calculates the amount of deviation as below.

FIG. 11 is a table presenting an example of calculation of the amount of deviation in a case where the magnification is unchanged.

FIG. 12 is a table presenting an example of calculation of the amount of deviation in a case where the magnification is changed.

A column "color plate" presents the type of color. A column "a)" presents the ideal position, in other words, a reference position. A column "b)" presents the position at which a pattern is detected. A column "c)" presents the result of calculation of the amount of deviation without consideration of the change of the magnification.

As illustrated in FIG. 11, in a case where the magnification is unchanged, the amount of deviation, in other words, the column "c)" is calculated by the difference between the columns "a)" and "b)."

Referring now to FIG. 12, a description is given of a case of cyan (C).

"1040.4" presented in the column "b)" is a result of calculation of "1020×(100+2)/100" based on "TKC1–Tc×(100+x)/100."

"–31" presented in the column "c)" is a result of calculation of "1000–{1020×(100–5)/100}" based on "TKC1–Tc×(100+x)/100."

"19" presented in a column "d)" is a result of calculation of "(1020×(100–5)/1001–(1000×(100–5)/100)."

"20" presented in a column "e)" is a result of calculation of "19×{100/(100–5)}."

The column "d)" presents the amount of deviation when the magnification is changed. By contrast, the column "e)" presents the amount of deviation when the magnification is unchanged.

For example, in a case where the magnification is "–5%" and the magnification is unchanged for the next image, the image forming apparatus 100 corrects the amount of deviation with accuracy based on the result of calculation presented in the column "d)." Even in a case where the amount of deviation is calculated with a magnification of "–5%" and the magnification is "+2%" for the next image, the image forming apparatus 100 corrects the amount of deviation with accuracy.

On the other hand, if a set magnification is not considered, the image forming apparatus 100 may erroneously recognize that there is a deviation. In order to prevent such erroneous recognition, the image forming apparatus 100 calculates the amount of deviation in consideration of the magnification as described above.

Figure 13:
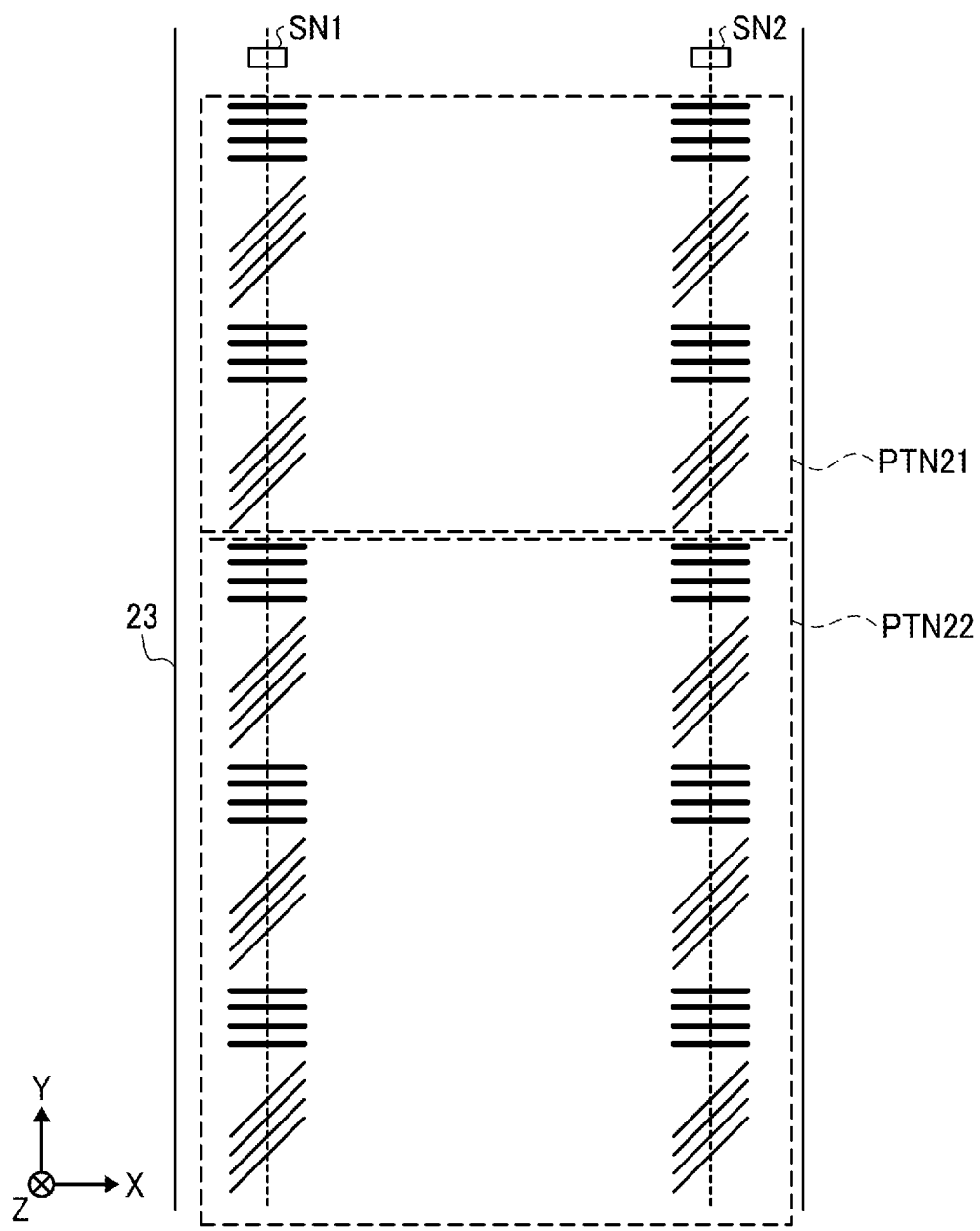
FIG. 13 is a diagram illustrating a pattern according to a second embodiment of the present disclosure.

Referring now to FIG. 13, a description is given of a second embodiment of the present disclosure.

FIG. 13 is a diagram illustrating a pattern according to the second embodiment.

In the second embodiment, the image forming apparatus 100 uses a pattern as illustrated in FIG. 13, for example.

The second embodiment is different from the first embodiment in that the image forming apparatus 100 uses patterns having different magnifications. Specifically, FIG. 13 illustrates a plurality of pattern sets. A twenty-first pattern PTN21 serving as a first pattern is formed with a normal magnification. In other words, the twenty-first pattern PTN21 is formed in a setting in which the magnification is unchanged.

By contrast, a twenty-second pattern PTN22 serving as a second pattern is formed in a setting in which the magnification is increased.

According to the present embodiment, a first magnification is a reference magnification; whereas a second magnification is a magnification greater than the first magnification.

Note that the combination and order of the magnifications are not limited to those illustrated in FIG. 13.

In the second embodiment, the image forming apparatus 100 calculates the amount of deviation for each of a plurality of patterns according to the magnification with which the corresponding one of the plurality of patterns is formed.

Accordingly, the image forming apparatus 100 calculates the amount of deviation with accuracy and performs an accurate correction even in a case where the magnification is changed during formation of patterns.

In a case where a plurality of patterns is formed with different magnifications, the image forming apparatus 100 may select one greater in number than another of the plurality of patterns to calculate the amount of deviation. In the example illustrated in FIG. 13, the first pattern includes two pattern sets. On the other hand, the second pattern includes three pattern sets. The results of detection of the two pattern sets are not used for calculation of the amount of deviation.

In this case, the image forming apparatus 100 may select the second pattern including more pattern sets than the first pattern to calculate the amount of deviation. Accordingly, the image forming apparatus 100 corrects the amount of deviation with accuracy even in a case where the patterns have different magnifications.

Now, a description is given of a third embodiment of the present disclosure.

Figure 14:
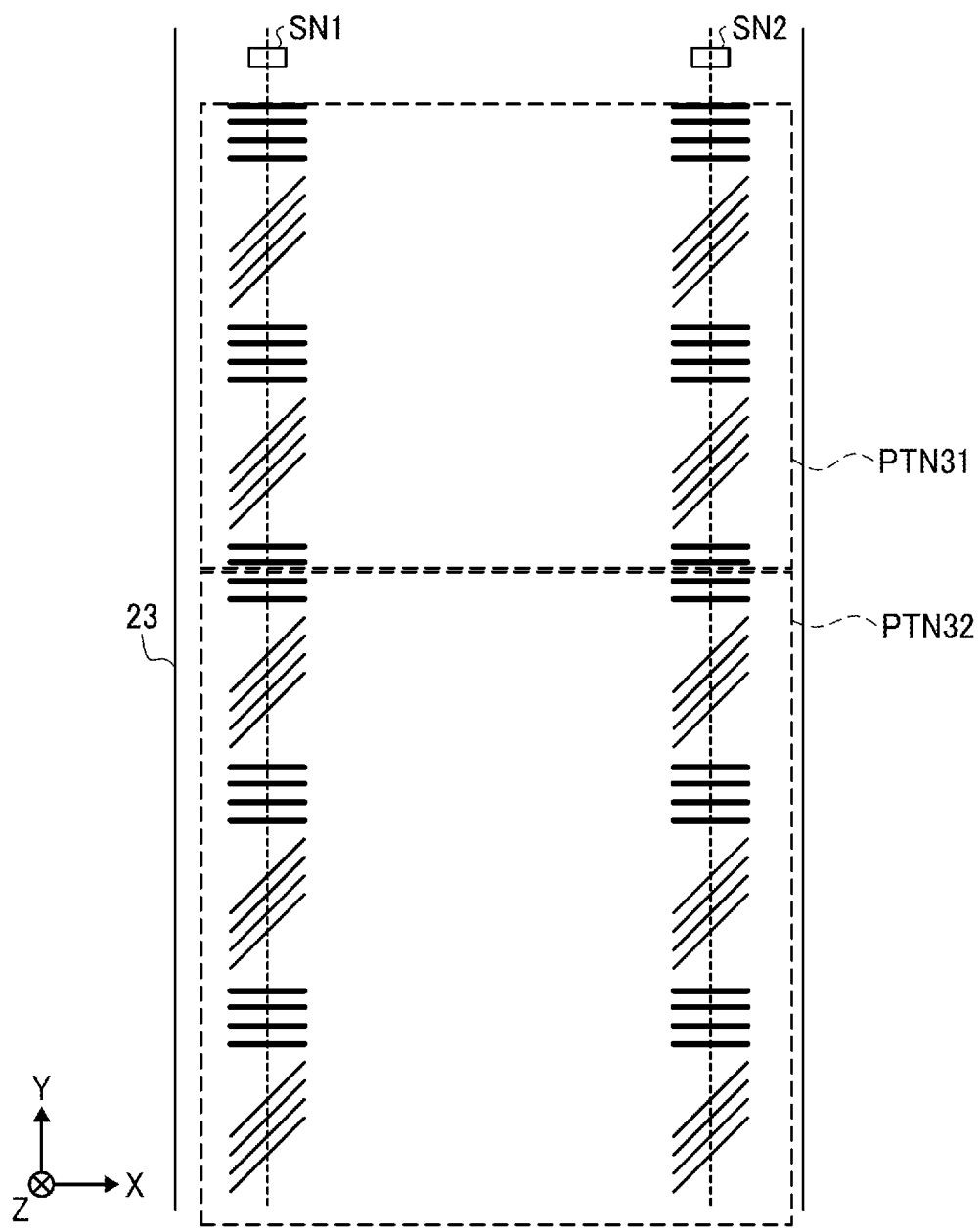
FIG. 14 is a diagram illustrating a pattern according to a third embodiment of the present disclosure.

FIG. 14 is a diagram illustrating a pattern according to the third embodiment.

A pattern in FIG. 14 is different from the patterns illustrated in FIG. 13 in that the magnification is changed during formation of the pattern. Specifically, a thirty-first pattern PTN31 is formed with a normal magnification. In other words, the thirty-first pattern PTN31 is formed in a setting in which the magnification is unchanged. By contrast, a thirty-second pattern PTN32 is formed in a setting in which the magnification is increased.

In the example illustrated in FIG. 14, four horizontal lines construct a pattern. In FIG. 14, the magnification of upper two lines (i.e., black and cyan lines) of the four horizontal lines is different from the magnification of lower two lines (i.e., magenta and yellow lines) of the four horizontal lines.

Such a pattern having the magnification changed during formation of the pattern may be excluded from calculation of the amount of deviation. Accordingly, the image forming apparatus 100 corrects the amount of deviation with accuracy even in a case where the magnification of a pattern is changed during formation of the pattern.

Now, a description is given of a functional configuration of the image forming apparatus 100.

Figure 15:
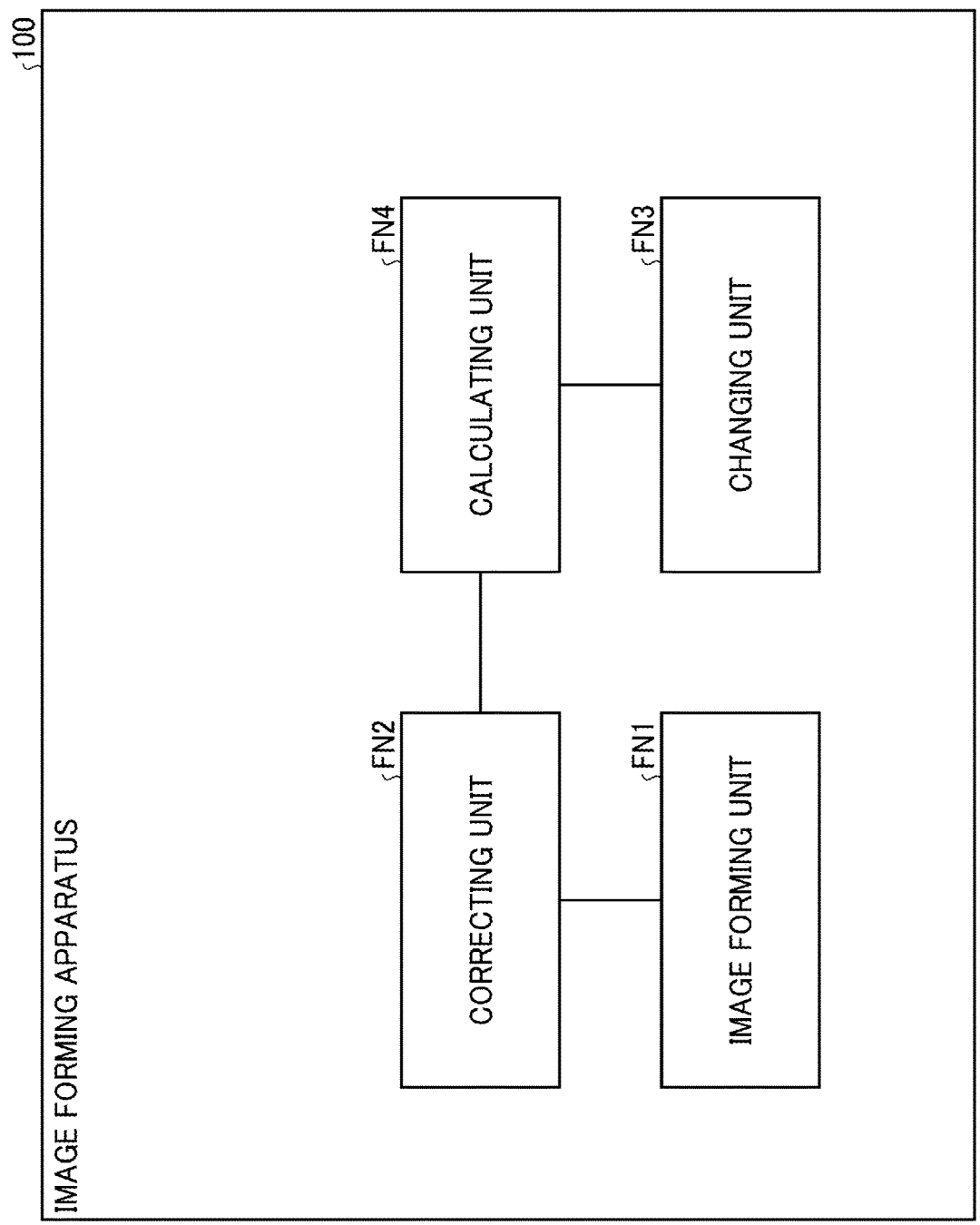
FIG. 15 is a diagram illustrating a functional configuration of an image forming apparatus according to an embodiment of the present disclosure.

FIG. 15 is a diagram illustrating an example of the functional configuration of the image forming apparatus 100.

For example, the image forming apparatus 100 includes an image forming unit FN1, a correcting unit FN2, a changing unit FN3, and a calculating unit FN4.

The image forming unit FN1 performs an image forming procedure that forms an image. For example, the image forming unit FN1 is implemented by the image forming device 20.

The correcting unit FN2 performs a correction procedure that corrects the amount of deviation based on a pattern formed.

For example, the correcting unit FN2 is implemented by the printer controller 1.

The changing unit FN3 performs a changing procedure that changes the magnification of the pattern. For example, the changing unit FN3 is implemented by the printer controller 1.

The calculating unit FN4 performs a calculation procedure that calculates the amount of deviation based on the magnification. For example, the calculating unit FN4 is implemented by the printer controller 1.

The pattern may change depending on the image magnification. For example, an image may be formed while the magnification varies. The magnification may change when the setting changes between pages.

In short, if the amount of deviation is calculated without consideration of the magnification, the deviation may be erroneously recognized. If correction is performed based on such an erroneously recognized amount of deviation, the deviation may be increased. In order to prevent such a situation, the image forming apparatus 100 calculates the amount of deviation in consideration of the magnification, thus calculating the amount of deviation with accuracy. Based on the amount of deviation thus calculated with accuracy, the image forming apparatus 100 performs an accurate correction even in a case where the image magnification changes.

Now, a description is given of some other embodiments of the present disclosure.

For example, part of processing of the image forming method described above may be implemented by a program such as firmware. In other words, the image forming method is a method executed by a computer operating an arithmetic device, a storage device, an input device, an output device, and a controller in cooperation with one another according to a program. The program may be written in, e.g., a storage device or a storage medium and distributed, or may be distributed through, e.g., an electric communication line.

Each of the devices or apparatuses described above does not have to be a single device or apparatus. For example, a device or an apparatus may be an image forming system including a plurality of devices. For example, as illustrated in FIG. 15, the image forming apparatus 100 may be an image forming system.

The image forming apparatus 100 may be, e.g., a commercial printer such as a large-sized electrophotographic printer or an inkjet printer.

The recording medium is, e.g., a sheet such as a sheet of plain paper. In addition to a sheet of plain paper, examples of the recording medium include, but are not limited to, a sheet of coated paper, a sheet of label paper, an overhead projector sheet, a film, a flexible thin plate, and a rolled sheet.

Specifically, the recording medium is a medium such as a sheet, a film, or cloth subjected to recording.

In short, the recording medium is made of paper, thread, fiber, fabric, leather, metal, plastic, glass, wood, ceramic, or a combination thereof.

Typical techniques do not assume a case where images are formed while the image magnification is changed.

According to the embodiments of the present disclosure, an accurate correction is performed even when the image magnification is changed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:
1. An image forming apparatus comprising:
an image forming device configured to form an image with a set magnification;
a sensor configured to detect a pattern formed by the image forming device; and
circuitry configured to:
correct an amount of deviation in color of the image based on the pattern formed by the image forming device and detected by the sensor;
change both a magnification of the pattern and the set magnification of the image; and
calculate the amount of the deviation based on the changed magnification of the pattern and the changed set magnification of the image.
2. The image forming apparatus according to claim 1, wherein the image forming device includes:
an image bearer configured to bear the pattern;
an intermediate transfer belt facing the image bearer;
a primary transfer device configured to transfer the pattern from the image bearer onto the intermediate transfer belt;
a secondary transfer belt facing the intermediate transfer belt; and
a secondary transfer device configured to transfer the pattern from the intermediate transfer belt to the secondary transfer belt.
3. The image forming apparatus according to claim 2, wherein the image bearer is a photoconductor.
4. The image forming apparatus according to claim 2, wherein the circuitry is configured to change a conveyance speed of the secondary transfer belt of the image forming device to change the set magnification of the image.
5. The image forming apparatus according to claim 1, wherein the image forming device is configured to form a plurality of patterns including the pattern with different magnifications, and
wherein the circuitry is configured to calculate the amount of the deviation for each of the plurality of patterns according to the magnification with which corresponding one of the plurality of patterns is formed.
6. The image forming apparatus according to claim 1, wherein the image forming device is configured to form a plurality of patterns including the pattern with different magnifications,
wherein the image forming device is configured to form:
at least one first pattern of the plurality of patterns with a first magnification; and
at least one second pattern of the plurality of patterns with a second magnification, and
wherein the circuitry is configured to select one greater in number than another of the at least one first pattern and the at least one second pattern to calculate the amount of the deviation.

7. The image forming apparatus according to claim 1, wherein the circuitry is configured to exclude the pattern having the magnification changed during formation of the pattern from calculation of the amount of the deviation.
8. The image forming apparatus according to claim 2, wherein the sensor is configured to detect the pattern on the secondary transfer belt.
9. The image forming apparatus according to claim 8, further comprising a plurality of sensors including the sensor aligned in a direction intersecting a conveyance direction of the secondary transfer belt.
10. The image forming apparatus according to claim 2, wherein the pattern includes:
a horizontal line intersecting a conveyance direction of the secondary transfer belt; and
an oblique line inclined with respect to the horizontal line.
11. The image forming apparatus according to claim 10, further comprising a plurality of image bearers including the image bearer configured to bear images in different colors,
wherein the pattern includes the horizontal line for each of the different colors and the oblique line for each of the different colors.
12. The image forming apparatus according to claim 10, wherein the image forming device is configured to form the horizontal line and the oblique line alternately along the conveyance direction of the secondary transfer belt.
13. An image forming system comprising:
an image forming device configured to form an image with a set magnification;
a sensor configured to detect a pattern formed by the image forming device; and
circuitry configured to:
correct an amount of deviation in color of the image based on the pattern formed by the image forming device and detected by the sensor;
change both a magnification of the pattern and the set magnification of the image; and
calculate the amount of the deviation based on the changed magnification of the pattern and the changed set magnification of the image.
14. An image forming method comprising:
forming an image with a set magnification;
detecting a pattern;
correcting an amount of deviation in color of the image based on the pattern formed by the forming and detected by the detecting;
changing both a magnification of the pattern and the set magnification of the image; and
calculating the amount of the deviation based on the changed magnification of the pattern and the changed set magnification of the image.
15. The image forming apparatus according to claim 1, wherein the color includes a plurality of colors, and
wherein a color among the plurality of colors is used as a reference color and the deviation in color is calculated as deviation for another color among the plurality of colors with respect to the reference color.

* * * * *